March 29, 1966  A. M. VIK  3,243,197

FRONT WHEEL MOUNTING FOR TRACTORS

Filed March 16, 1964  2 Sheets-Sheet 1

INVENTOR.
ALBAM M. VIK
BY William F. Woode

March 29, 1966 A. M. VIK 3,243,197
FRONT WHEEL MOUNTING FOR TRACTORS
Filed March 16, 1964 2 Sheets-Sheet 2

INVENTOR.
ALBAM M. VIK
BY William F. Woods

United States Patent Office 3,243,197
Patented Mar. 29, 1966

3,243,197
FRONT WHEEL MOUNTING FOR TRACTORS
Albam M. Vik, New Brighton, Minn., assignor, by direct and mesne assignments, of one-half to Alois J. Haider, and one-half to Winston R. Hultstrand, both of Minneapolis, Minn.
Filed Mar. 16, 1964, Ser. No. 352,265
8 Claims. (Cl. 280—80)

This invention relates to an improved front wheel mounting for tractors, and more particularly, but not necessarily exclusively to improved apparatus of this type including means for transmitting load forces from one wheel to another to equalize the front end load over both wheels and permit the tractor to move over rough ground and ridges in a field without excessive up and down movement of the wheels.

The general object of the invention is to provide an improved front wheel mounting for tractors. Other objects of the invention are: to provide an improved front wheel mounting for tricycle type tractors including means for differentially connecting the wheels so that as one wheel moves up the other wheel will move down a corresponding distance; to provide improved apparatus of this type including means for transmitting load forces without the use of gears or similar mechanism that may fail under adverse service conditions; to provide in a front wheel mounting for farm tractors novel means for transferring the load from one wheel to the other without imposing excessive stresses and strains upon the moving parts; to provide improved apparatus of this type characterized by novel load bearing means adapted to meet any service condition; to provide in a tractor mounting for closely spaced front wheels novel and improved means for limiting the forces carried by the moving parts; to provide improved apparatus of this type including novel linkage and load carrying elements combined so as to permit the wheels to be mounted for rotation about a common transverse axis; to provide an improved front wheel mounting for tractors including novel wheel carrying structure formed integral with the rotating elements making up part of the load transmitting assembly; to provide improved apparatus of this type which can be mounted upon virtually any tractor, without requiring modification of the tractor; and in general, to provide an improved front wheel mounting for tractors which is highly versatile and dependable in operation, simple and inexpensive to construct, and rugged and long wearing in service.

These and other objects and advantages of the invention will become more fully apparent from a consideration of the following detailed description and accompanying drawings wherein a preferred embodiment of the invention is shown by way of illustration and not by way of limitation.

Briefly stated, my tractor mounting structure includes a pedestal type hollow housing that is secured to the front end of a tricycle type farm tractor. Interiorly of the housing an upper load transmitting member is rockably mounted for limited pivotal movement about a transverse axis. A pair of lower load transmitting members are rockably mounted below the upper member for pivotal movement about a common axis parallel to the axis of rotation of the upper member. The lower members are each formed integral with a cranked axle and wheel mounting structure which extends rearwardly in laterally outwardly spaced relation to the housing. A pair of link members pivotally connect the upper load transmitting member with the independently rotatable lower members so that as the wheel secured to one of the cranked axles moves upwardly the other wheel correspondingly moves downwardly. The resulting differential movement permits the load to be equally carried by each wheel when the tractor moves over rough ground and also greatly increases operator comfort and efficiency. Stops on the housing limit the up and down movement of the wheels by engaging the crank axles.

Figure 1:
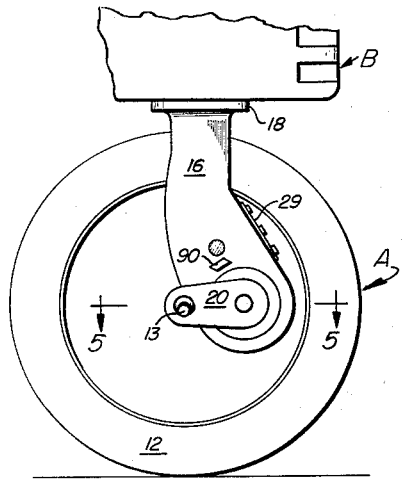
FIGURE 1 is a side elevation showing the invention mounted on a tractor, with one wheel removed for purposes of clarity.
Figure 2:
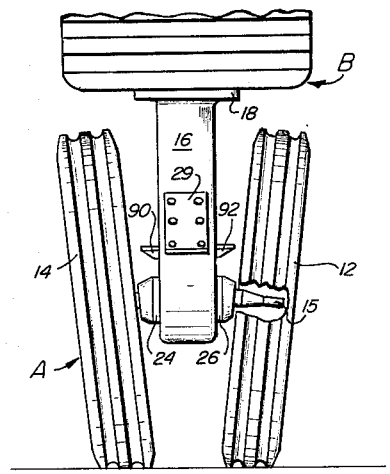
FIGURE 2 is a front view of the tractor shown in FIGURE 1.
Figure 3:
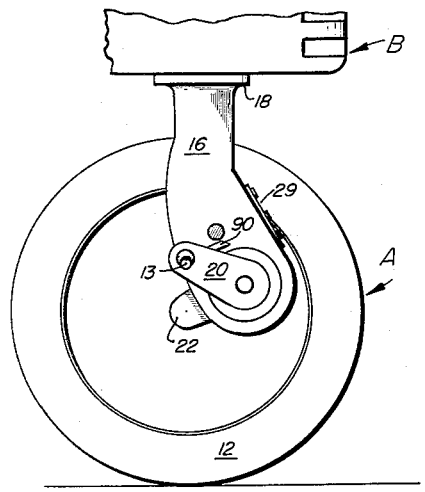
FIGURE 3 is a view similar to FIGURE 1 illustrating the crank axles in opposed up and down relationship.
Figure 4:
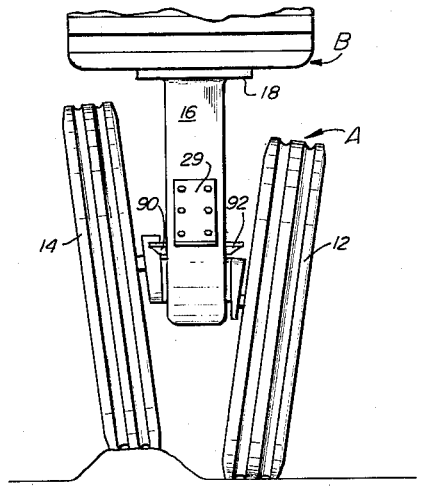
FIGURE 4 is a view similar to FIGURE 2 showing the wheels and crank axles in opposed up and down relationship.
Figure 5:
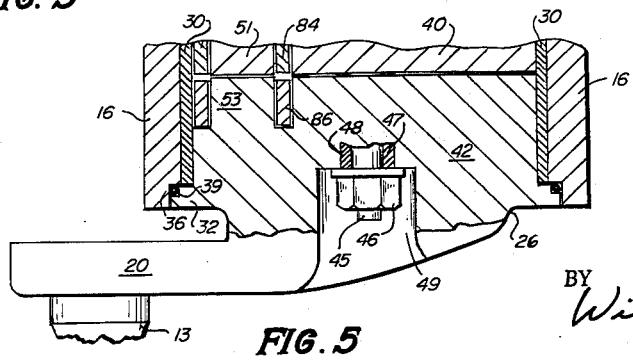
FIGURE 5 is an enlarged fragmentaray view, partially in section, taken substantially along the line 5—5 of FIGURE 1.
Figure 6:
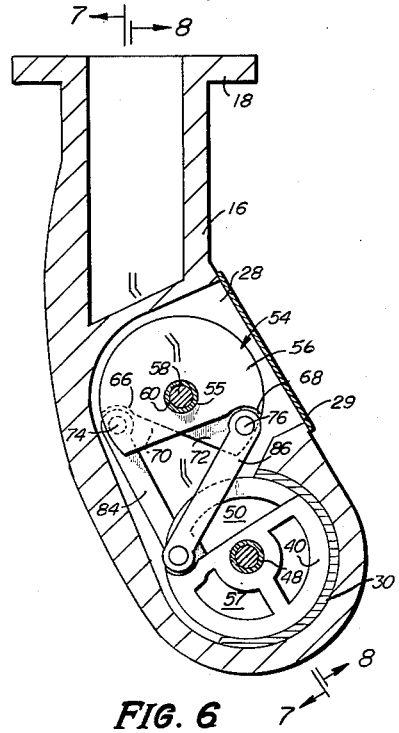
FIGURE 6 is a half section view of the housing and associated elements forming part of the invention.
Figures 7, 8:
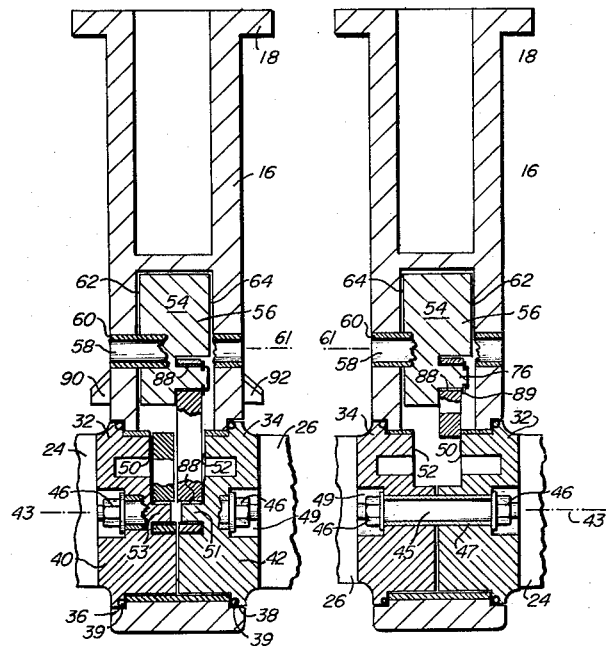
FIGURE 7 is a view taken along the line 7—7 of FIGURE 6.
FIGURE 8 is a view taken along the line 8—8 of FIGURE 6.
Figure 9:
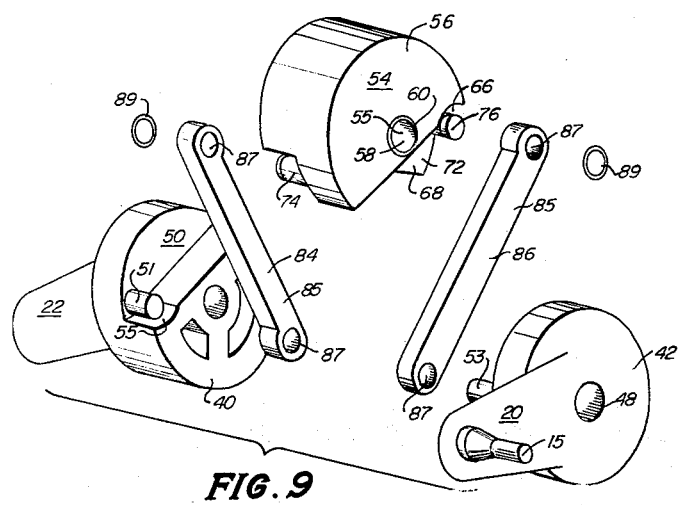
FIGURE 9 is an exploded perspective view illustrating part of the invention.

Turning now to the drawings, the invention, indicated in its entirety by the reference character A, is shown in shown in FIGURES 1–4 mounted in place upon the front end of a tractor B. A pair of ground engaging wheels 12, 14 are carried by a hollow downwardly and slightly forwardly inclined housing 16 having a pedestal 18 which is bolted to the tractor front end. The wheels 12, 14 are journaled on spindles 13, 15 carried at the rearward ends of cranked axles or arms 20, 22 which extend rearwardly from housing 16 in a laterally outwardly spaced relation thereto. The forward ends of said axles have radially enlarged trunnions 24, 26 which are journaled transversely along a common axis within a lower chamber 28 of housing 16 upon a sleeve type bearing 30 which extends across the width of and lower circumference of chamber 28, as shown in FIGURES 6-8. Between each trunnion 24, 26 and axle 20, 22 are radially outwardly extending shoulders 32, 34 which engage mating recesses 36, 38, respectively, milled into the outer opposite surfaces of housing 16. An O-ring 39 is provided between each shoulder 32, 34 and the recesses 36, 38 of housing 16 to seal chamber 28 and prevent the leakage of oil therefrom. An access plate 29 is provided on housing 16 forwardly of chamber 28. Carried within chamber 28 of housing 16 and integral with trunnions 24, 26, respectively, of axles 20, 22, are a pair of closely transversely spaced generally circular shaped lower idler members 40, 42. Idler member 40 is rotatable with trunnion 24 and axle 20 while idler member 42 is rotatable with trunnion 26 and axle 22. Both assemblies rotate about a common transverse axis 43 adjacent the lower end of housing 16; they are held together by a floating tie bolt 45 which extends through trunnions 24, 26 and idler members 40, 42. Tie bolt 45, secured by nuts and washers 46, is surrounded by an elongated hollow bearing member 47 which engages the inner surface of a bore 48 extending through trunnions 24, 26 and idler members 40, 42. Trunnions 24, 26 are recessed, as at 49 to receive tie bolt 45.

Each idler member 40, 42 is characterized by an axially inwardly facing generally circular segmental area 50 of reduced thickness which is machined generally above that part of idler members 40, 42 above the pivot axis 43. This construction allows a pivot post member to be formed on each idler member 40, 42, in the area 50 and adjacent their rear perimeter, as at 51, 53. Clearance 55 is provided adjacent posts 51, 53 and idler members 40, 42 may be formed with openings 57 to conserve weight.

Also mounted within housing 16 is an upper idler member 54 having a generally circular shaped body 56 of greater axial thickness than lower idler members 40, 42. Idler member 54 is centrally board, as at 55, and rotatably mounted upon a transverse bearing shaft 58 which extends through housing 16. A hollow elongated bearing 60 surrounds bearing shaft 58. As can be seen in FIGURES 6–9, upper idler member 54 is mounted for rotation within chamber 28 of housing 16 about a transverse pivot axis 61. Pivot axis 61 is above and behind pivot axis 43. Each side 62, 64 of body 56 of idler member 54 extends in full axial thickness below pivot axis 61 and then is cut out along axially opposed circular segmental areas 66, 68 which are inclined with respect to each other. This construction results in a pair of triangular shaped axially outwardly facing exposed surfaces 70, 72, upon which are formed pivot posts 74, 76, respectively. Post 74 is located below pivot axis 61 adjacent the rear perimeter of idler member 54 and post 76 is located in a similar manner adjacent the forward perimeter of idler member 54. Both posts 74, 76 are in substantial axial alignment with posts 51, 53 of lower idler members 40, 42. Clearance 66 is provided adjacent each post 74, 76.

Upper idler member 54 and lower idler members 40, 42 act to differentially connect the wheels 12, 14 in such manner that as either moves upwardly, by swinging movements of its associated cranked axle, the other will move downwardly a corresponding distance. This coaction is accomplished by virtue of a pair of link members 84, 86 which rockably connect idler member 54 with idler members 40, 42. Each link member 84, 86 is characterized by an elongated body 85 having post receiving bores 87 and an internal bearing 88 adjacent each end. A retainer ring 89 secures link members 84, 86 on posts 74, 76 while the lower ends of the link members 84, 86 are slipped over posts 51, 53 and are prevented from axial displacement by the closely spaced mounting of the idler members 40, 42 within housing 16. As shown in FIGURES 6–9, both link members 84, 86 are pivotally connected at their lower ends to post members 51, 53 of idler members 40, 42 rearwardly of axis 43. Link member 84 is pivotally connected at its upper end to rear post 74 of idler member 54 while link member 86 is pivotally connected at its upper end to forward post 76 of idler member 54.

To limit the up and down differential movement of axles 20, 22 a pair of exterior lugs 90, 92 are provided on housing 16 above axles 20, 22. These lugs are located so that the spindles 13, 15 carrying wheels 12, 14 are allowed a total vertical displacement of about 5", that is, they move 2½" above and 2½" below the axis 43 before contact of the cranked axles is made with lugs 90, 92.

The structure set forth is very efficient in design and operation in that relatively few parts are used and each of the main load transmitting elements, viz., the upper idler member 54, the lower idler members 40, 42 and their associated crank axles 20, 22, and the link members 84, 86 may be made of forged materials combining light weight and high strength characteristics. Moreover, the load transmitted by the wheels 12, 14 is carried in the main by lower idler members 40, 42 which ride upon the large surface area of bearing member 30. The link members 84, 86 are at all times under a compressive load condition except when both wheels 12, 14 are jacked up off the ground, at which time the link members 84, 86 carry only the weight of the wheels. The manner in which the link members 84, 86 are connected to upper idler member 54 and lower idler members 40, 42 permits the wheels 12, 14 to accommodate themselves to irregularities in the road or field surface over which they travel and maintain equal load distribution at all times. The differential mechanism herein disclosed provides a pair of wheel axles that rotate about a common transverse axis with each axle being of equal length and adapted to uniformly transmit load forces from one wheel to the other with a minimum of internal friction or binding. The closely spaced axial relation between idler members 40, 42 along axis 43 permits face to face contact of their entire inner surfaces under extreme conditions so as to prevent buckling or distortion. These inner surfaces are separated by a thin film of lubricant which effectively prevents damage under such conditions. When the force transmitted from one wheel to the other becomes excessive, the crank axles are crowded against lugs 90, 92 whereby to transmit the load to housing 16 and thus relieve the crank axle assembly from undue stresses and strains.

The invention has been thoroughly tested and found to be entirely satisfactory for the uses intended. It is believed that the invention, its mode of construction and assembly and operation, as well as its advantages should be readily understood from the foregoing without further description, and it should also be manifest that while a preferred embodiment of the invention has been shown and described for illustrative purposes, the structural details are nevertheless capable of wide variation within the purview of the invention as defined in the appended claims. Thus for example, when the words "upper idler member" is used in the claims, it is apparent that a rocker arm non-circular in shape could be used in place of the circular member shown and described; similarly, when the words "lower idler members" are used in the claims, it should be understood that a pair of rocker arms non-circular in shape could be used in place of the circular members adverted to hereinabove. And although the crank axle assembly is shown as being formed of one piece, it should be understood that such construction could be altered so that several connected parts could be used without departing from the spirit and scope of the claims.

I claim:

1. In a front wheel mounting for tractors, comprising in combination, a housing secured to the front end of a tractor, a pair of lower idler members pivotally mounted within said housing for rocking movement about a transverse axis, wheel supporting crank axles secured to each of said lower idler members and extending rearwardly thereof in laterally outwardly spaced relation to said housing, an upper idler member pivotally mounted within said housing above said lower idler members for rocking movement about a transverse axis, a first link member pivotally connected at its upper end to said upper idler member forwardly of its pivot axis and pivotally connected at its lower end to one of said lower idler members rearwardly of its pivot axis, and a second link member pivotally connected at its upper end to said upper idler member rearwardly of its pivot axis and pivotally connected at its lower end to the other of said lower idler members rearwardly of its pivot axis, said link members and said idler members differentially connecting said wheel supporting crank axles for transmitting load forces from one wheel to the other while permitting limited up and down movements thereof with respect to the tractor.

2. The combination of claim 1 wherein said link members are pivotally mounted on posts secured to said idler members.

3. The combination of claim 1 wherein said idler members are generally circular in shape and wherein portions thereof are reduced in thickness to permit the mounting of said link members thereon within the plane of said idler members.

4. The combination of claim 1 wherein said lower idler members are held within said housing by means of a floating tie bolt.

5. The combination of claim 1 wherein stop lugs are provided on said housing for limiting the upward displacement of said crank axles.

6. In a front wheel mounting for tractors;
(a) a supporting housing;
(b) an upper idler member transversely, pivotally mounted in said housing;
(c) a pair of lower idler members transversely, pivotally mounted in said housing, each of said lower idler members including rearwardly extending wheel supporting means; and
(d) a pair of link means each having one end connected to one of said lower idler members on the same side of the pivotal axis thereof, the other ends of said link means being connected to said upper idler member on opposite sides of the pivotal axis thereof.

7. The apparatus of claim 6 in which the idler members are generally circular in shape and wherein portions thereof are reduced in thickness to permit the connecting of said link members within the plane of the idler members.

8. The apparatus of claim 7 in which the lower idler members are disposed on a floating tie bolt.

References Cited by the Examiner
UNITED STATES PATENTS

| | | | |
|---|---|---|---|
| 2,208,601 | 7/1940 | Ronning | 280—81 X |
| 2,209,095 | 7/1940 | Ronning | 280—87 X |
| 2,217,818 | 10/1940 | Ronning | 280—87 |
| 2,236,734 | 4/1941 | Ronning | 280—87 |
| 2,620,203 | 12/1952 | Love | 280—104 |
| 2,793,872 | 5/1957 | Preslicka | 280—80 |

KENNETH H. BETTS, *Primary Examiner.*

BENJAMIN HERSH, *Examiner.*